US010835956B2

(12) United States Patent
Sun et al.

(10) Patent No.: US 10,835,956 B2
(45) Date of Patent: Nov. 17, 2020

(54) HOPPER FOR POWDER BED FUSION ADDITIVE MANUFACTURING

(71) Applicant: Nanyang Technological University, Singapore (SG)

(72) Inventors: Zhongji Sun, Singapore (SG); Swee Leong Sing, Singapore (SG); Chee Kai Chua, Singapore (SG); Zhonghong Alexander Liu, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 150 days.

(21) Appl. No.: 15/744,058

(22) PCT Filed: Jul. 25, 2016

(86) PCT No.: PCT/SG2016/050346
§ 371 (c)(1),
(2) Date: Jan. 12, 2018

(87) PCT Pub. No.: WO2017/018935
PCT Pub. Date: Feb. 2, 2017

(65) Prior Publication Data
US 2018/0354035 A1  Dec. 13, 2018

(30) Foreign Application Priority Data
Jul. 24, 2015  (SG) .......................... 10201505790W

(51) Int. Cl.
B22F 3/105 (2006.01)
B33Y 10/00 (2015.01)
(Continued)

(52) U.S. Cl.
CPC .............. B22F 3/1055 (2013.01); B22F 7/02 (2013.01); B22F 7/06 (2013.01); B33Y 10/00 (2014.12);
(Continued)

(58) Field of Classification Search
CPC .. B22F 3/1055; B22F 7/06; B22F 7/02; B22F 2003/1056; B33Y 40/00; B33Y 30/00; B33Y 10/00; Y02P 10/295
See application file for complete search history.

(56) References Cited

U.S. PATENT DOCUMENTS 3,411,197 A * 11/1968 Soosanin .................. B22F 7/02
                                                    419/3
5,064,099 A * 11/1991 Iwako ................. B01F 15/0235
                                                    222/142

FOREIGN PATENT DOCUMENTS

CN     202239627 U      5/2012
EP      2191922 A1 *    6/2010  ........... B29C 64/153
(Continued)

OTHER PUBLICATIONS

P. Regenfuss, A. Streek, L. Hartwig, S. Klötzer, T. Brabant, M. Horn, R. Ebert, H. Exner, Principles of laser micro sintering, Rapid Prototyping Journal, 13 (2007) 204-212.
(Continued)

Primary Examiner — Jessee R Roe
Assistant Examiner — Rebecca Janssen

(57) ABSTRACT

A hopper for powder bed fusion additive manufacturing, the hopper comprising: a recoater having a volume for holding powder metal therein; the recoater having a dispensing opening for depositing therethrough powder metal from the volume, a divider dividing the volume into a first compartment and a second compartment and dividing the dispensing opening into a first opening portion and a second opening portion; and a first roller arranged in parallel with a second roller, the first roller provided at the first opening portion and the second roller provided at the second opening portion, a longitudinal axis of the first roller being perpendicular to direction of movement of the hopper during powder metal deposition; wherein rotation of the first roller and rotation of
(Continued)

the second roller dispenses a first powder metal and a second powder metal from the first compartment and the second compartment respectively through the first opening portion and the second opening portion respectively, and wherein the first roller and the second roller are configured to rotate selectably and independently of each other.

11 Claims, 9 Drawing Sheets

(51) Int. Cl.
*B33Y 40/00* (2020.01)
*B33Y 30/00* (2015.01)
*B22F 7/02* (2006.01)
*B22F 7/06* (2006.01)

(52) U.S. Cl.
CPC .............. *B33Y 30/00* (2014.12); *B33Y 40/00* (2014.12); *B22F 2003/1056* (2013.01); *Y02P 10/295* (2015.11)

(56) References Cited

FOREIGN PATENT DOCUMENTS

| EP | 2191992 A2 | 6/2010 | |
|---|---|---|---|
| RU | 2408244 C2 * | 1/2011 | .............. G07F 11/62 |
| WO | WO2015061918 A1 | 5/2015 | |
| WO | WO2015082677 A1 | 6/2015 | |
| WO | WO2017018935 A1 | 2/2017 | |

OTHER PUBLICATIONS

O.M. Al-Jamal, S. Hinduja, L. Li, Characteristics of the bond in Cu—H13 tool steel parts fabricated using SLM, CIRP Annals—Manufacturing Technology, 57 (2008) 239-242.

V.E. Beal, P. Erasenthiran, C.H. Ahrens, P.M. Dickens, Evaluating the use of functionally graded materials inserts produced by selective laser melting on the injection moulding of plastics parts, Proceedings of the Institution of Mechanical Engineers, Part B: Journal of Engineering Manufacturing, 221 (2007) 945-954.

Foreign Communication From a Related Counterpart Application, International Search Report and Written Opinion dated Sep. 29, 2016, International Application No. PCT/SG2016/050346, filed on Jul. 25, 2016.

* cited by examiner

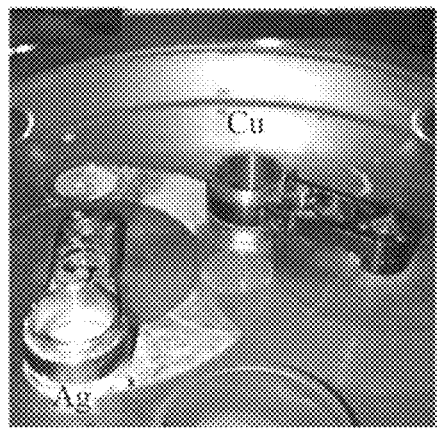
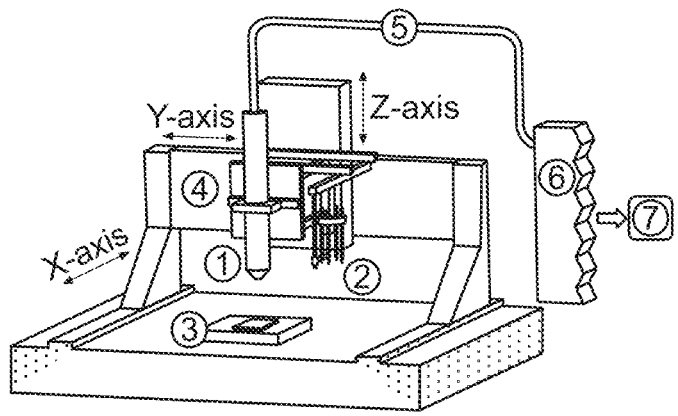
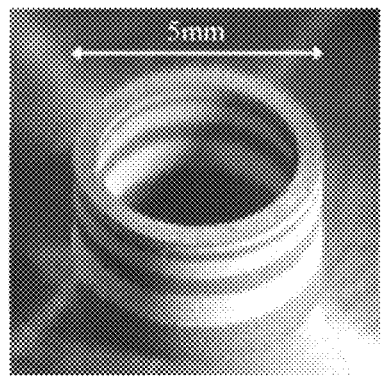
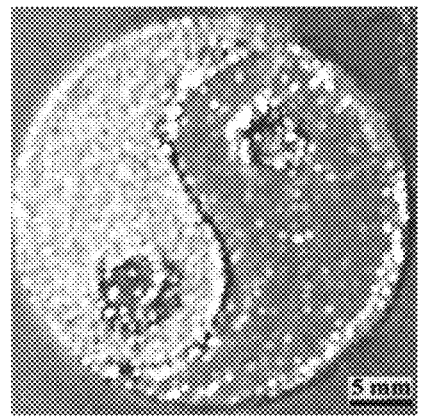
Fig. 1(a) - Prior Art    Fig. 1(b) - Prior Art

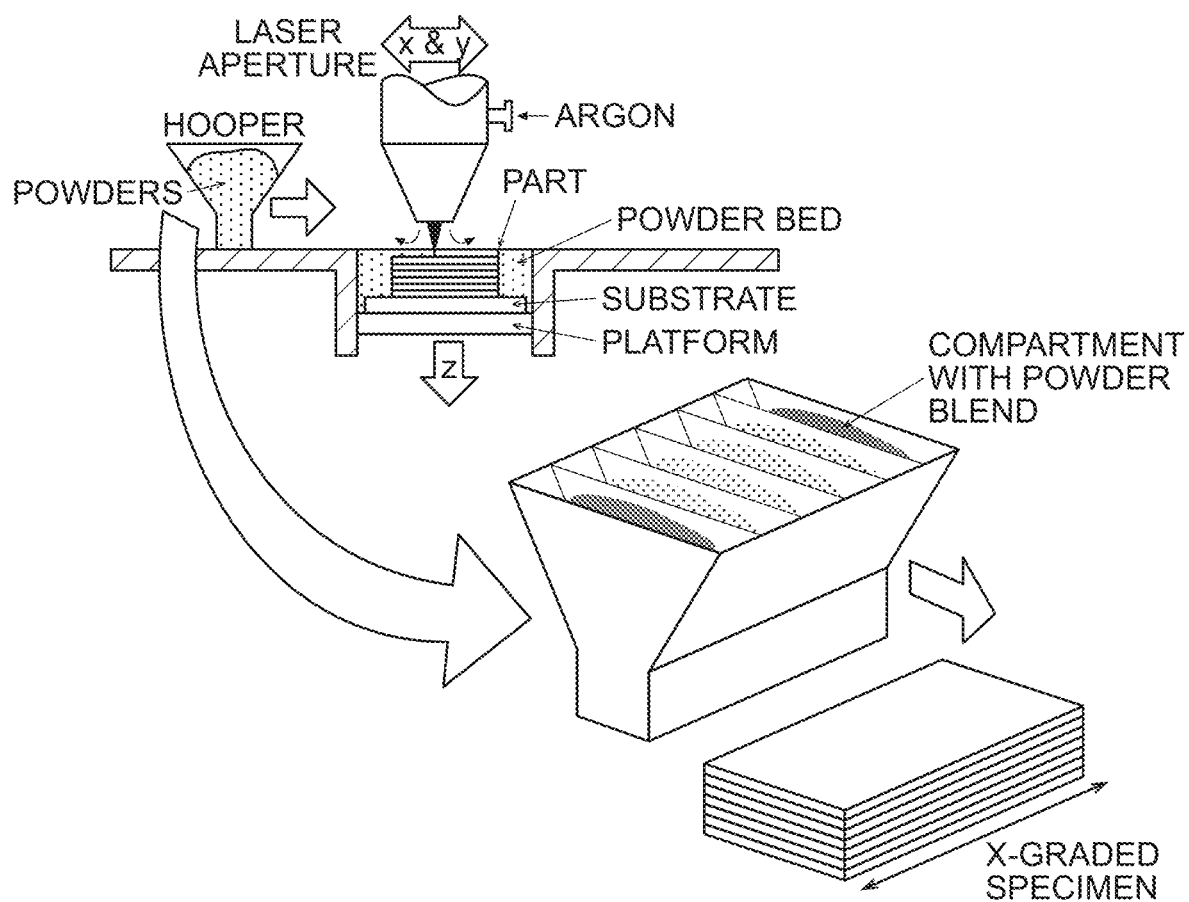
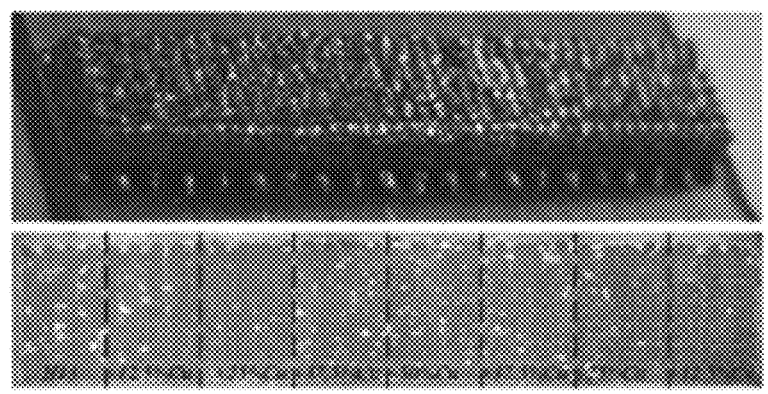
Fig. 1(c) – Prior Art

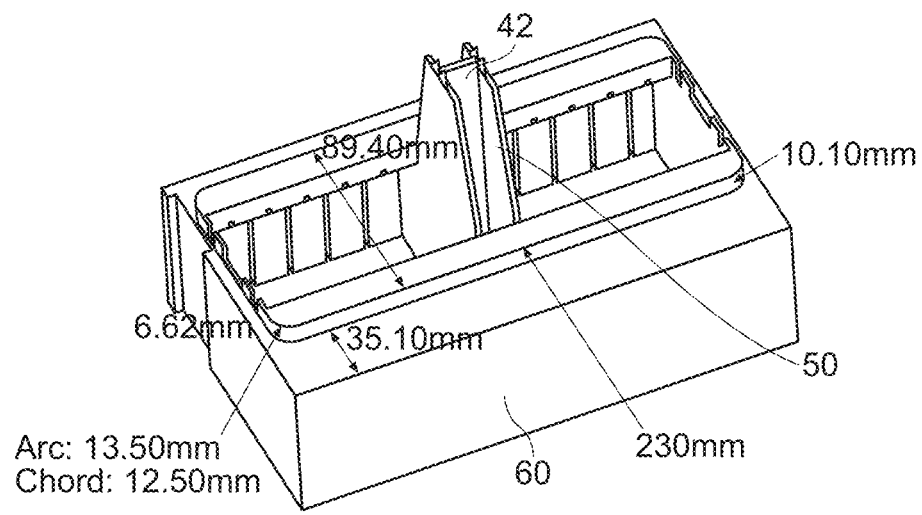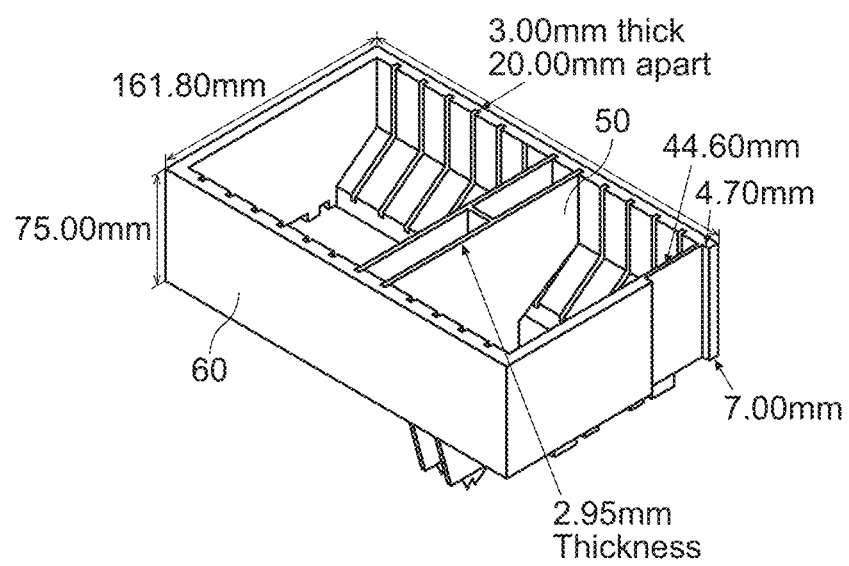
Fig. 7

HOPPER FOR POWDER BED FUSION ADDITIVE MANUFACTURING

CROSS-REFERENCE TO RELATED APPLICATIONS

This application is a filing under 35 U.S.C. 371 as the National Stage of International Application No. PCT/SG2016/050346, filed Jul. 25, 2016, entitled "HOPPER FOR POWDER BED FUSION ADDITIVE MANUFACTURING," and which claims the benefit of and priority to Singapore Application No. 10201505790W, filed with the Intellectual Property Office of Singapore on Jul. 24, 2015, both of which are incorporated herein by reference in their entirety for all purposes.

FIELD

This invention relates to a hopper for powder bed fusion additive manufacturing.

BACKGROUND

With the development of additive manufacturing (AM), greater design freedom is enjoyed by designers as more complex shapes can be fabricated. Several metallic materials such as stainless steel, aluminium and copper have been successfully applied in AM. However, one of the limitations for AM compared to other traditional manufacturing methods is the ability to manufacture multi-material products. Multi-material products refer to parts comprising of two or more materials of different compositions, providing the parts with specific and varying properties such as thermal conductivity, electrical conductivity and mechanical properties. These multi-material products may also include materials that gradually change in composition, i.e. functionally graded materials.

Currently, none of the major metallic AM processes like selective laser melting (SLM), electron beam melting (EBM) and laser engineered net shaping (LENS) are designed to fabricate multi-materials. LENS is believed to have an advantage in terms of multi-material fabrication due to its greater freedom in the powder deposition method. Nevertheless, SLM and EBM have better fabrication accuracy compared to LENS. In order to deposit multi-materials in a single product or part in powder bed fusion additive manufacturing such as SLM and EBM, it is usually required to stop the process and change the material in the recoater (hopper) from which the material is deposited. This slows down the process, and opening the build chamber to change the material in the recoater increases the chance of contamination and oxidation of the materials in the build chamber. With more complex parts, it is therefore not practical to do so.

There have been a limited number of attempts to fabricate multi-material parts using AM. Several methods were developed to deposit multi-materials. Regenfuss et al. [1] used two powder rakes to deposit different materials in a selective laser sintering (SLS) process shown in FIG. 1(a)—prior art. The drawback of this design is that it can only deposit multi-materials in the z or upward build direction. Also, there is limited space for the printing platform because of the movement of the rakes. Al-Jamal et al. [2] adapted a CNC machine to fit it with four nozzles and hoppers. Each of nozzle and hopper carries a different material and the material in powder form was deposited via vibration from a piezoelectric translator, as shown in FIG. 1(b)—prior art. However, accuracy of nozzle deposition was difficult to control and therefore the fabricated piece was thin. Beal et al. [3] came up with a hopper design to deposit multi-materials. A hopper with multiple compartments was each filled with different materials for deposition, as shown in FIG. 1(c)—prior art. Nevertheless, this hopper design can only fabricate products of multi-materials in the y direction (the hopper moving in both directions along the x axis during powder deposition). Opening of the build chamber and replacement of materials in the hopper compartments would still be required if fabricating products of multi-materials in the z direction is needed.

There is therefore still no effective mechanism to allow parts of multi-materials in all directions to be fabricated while adhering to the principle of powder bed fusion.

SUMMARY

The presently disclosed multi-material hopper works with SLM and other powder bed fusion AM processes to fabricate multi-materials in both y and z directions in a single build without requiring opening of the build chamber in the midst of the SLM or other powder bed fusion AM process. The hopper and method are adaptable to a conventional SLM or other powder bed fusion AM machine to enable multi-material deposition that may be adapted for use in a commercial SLM or other powder bed fusion AM machine.

The hopper disclosed in this application comprises a recoater that can deposit materials in both y and z directions without opening the working chamber. This is an improvement compared to the prior art shown in FIG. 1(a)—prior art and FIG. 1(c)—prior art. Compared to the nozzle deposition method shown in FIG. 1(b)—prior art, hopper deposition is much faster and more stable, and can therefore also build higher objects. Therefore, the presently disclosed hopper and method is an improvement over existing possible methods and apparatus.

According to a first aspect, there is provided a hopper for powder bed fusion additive manufacturing, the hopper comprising: a recoater having a volume for holding powder metal therein; the recoater having a dispensing opening for depositing therethrough powder metal from the volume, a divider dividing the volume into a first compartment and a second compartment and dividing the dispensing opening into a first opening portion and a second opening portion; and a first roller arranged in parallel with a second roller, the first roller provided at the first opening portion and the second roller provided at the second opening portion, a longitudinal axis of the first roller being perpendicular to direction of movement of the hopper during powder metal deposition; wherein rotation of the first roller and rotation of the second roller dispenses a first powder metal and a second powder metal from the first compartment and the second compartment respectively through the first opening portion and the second opening portion respectively, and wherein the first roller and the second roller are configured to rotate selectably and independently of each other.

The hopper may further comprise a number of partition dividers separating the hopper into a number of separate partitions along an axis perpendicular to direction of movement of the hopper wherein each partition can be filled with powder metal and is in fluid communication with the dispensing opening.

The volume divided into the first compartment and the second compartment by the divider may be provided in one of the partitions.

More than one of the partitions may be divided into compartments by the divider.

The number of partition dividers may be assembled with a hopper shell to form a hopper assembly, the hopper assembly assembled on the recoater.

The shell may have multiple slots configured to engage the number of partition dividers.

The hopper may further comprise a number of actuators configured to move and reposition the number of partition dividers in the hopper shell.

According to a second aspect, there is provided method of powder bed fusion additive manufacturing using the hopper of any preceding claim, the method comprising:
(a) providing a powder metal of a first material in the first compartment;
(b) providing a powder metal of a second material in the second compartment;
(c) rotating the first roller to deposit the first material during movement of the hopper;
(d) fusing portions of the first material;
(e) rotating the second roller to deposit the second material during movement of the hopper;
(f) fusing portions of the second material.

Movement of the hopper in step (c) may be in a first direction and movement of the hopper in step (e) is in a second direction.

Steps (c) and (d) may be repeated after steps (e) and (f).

Steps (c) and (d) may be repeated a number of times before steps (e) and (f).

Steps (e) and (f) may be repeated a number of times.

Step (e) may be performed before step (d) and movement of the hopper in steps (c) and (e) may be in a same direction so that the first material and the second material are deposited in a same layer.

BRIEF DESCRIPTION OF FIGURES

In order that the invention may be fully understood and readily put into practical effect there shall now be described by way of non-limitative example only exemplary embodiments of the present invention, the description being with reference to the accompanying illustrative drawings.

FIG. 1(a)—prior art shows different materials carried by different rakes to form a multi-material product in only the z direction.

FIG. 1(b)—prior art shows a nozzle deposition apparatus to form a multi-material product.

FIG. 1(c)—prior at shows a multi-compartment hopper to form a multi-material product in only the y direction.

FIG. 7 shows dimensions of the hopper shell of FIG. 6(c) and thickness of the partition divider of FIG. 6(a).

DETAILED DESCRIPTION

Figure 2:
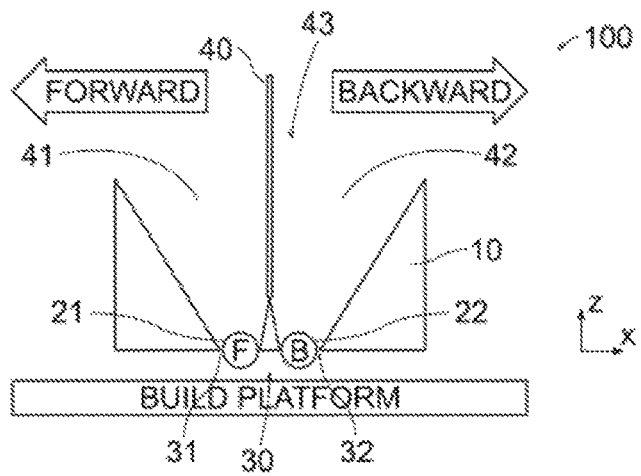
FIG. 2 is a schematic illustration of a side view of a first exemplary embodiment of the hopper.

Exemplary embodiments of the hopper 100 for powder bed fusion additive manufacturing such as selective laser melting and method 200 of powder bed fusion additive manufacturing such as selective laser melting 200 will be described below with reference to FIGS. 2 to 13. The same reference numerals are used throughout the figures to denote the same or similar parts among the various embodiments.

Figure 3:
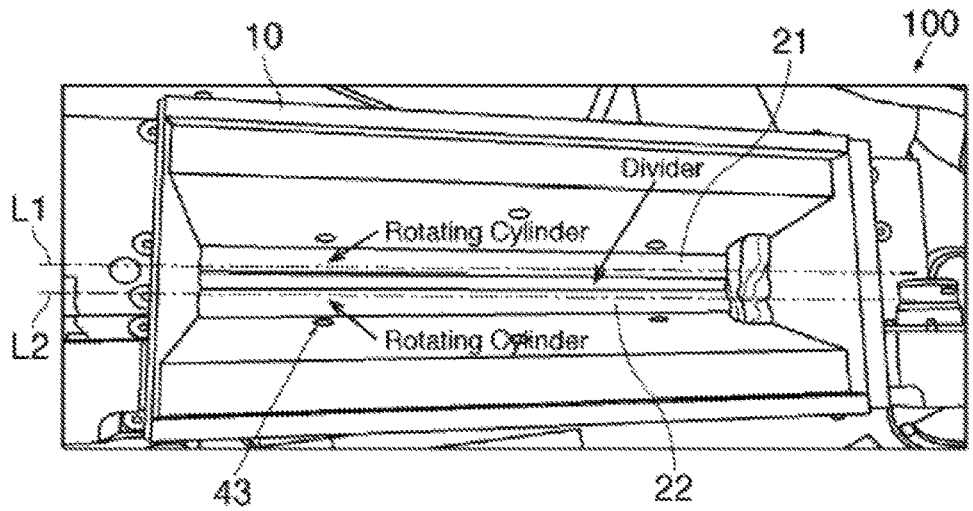
FIG. 3 is photograph of a top view of the hopper of FIG. 2 with the divider.
Figure 4:
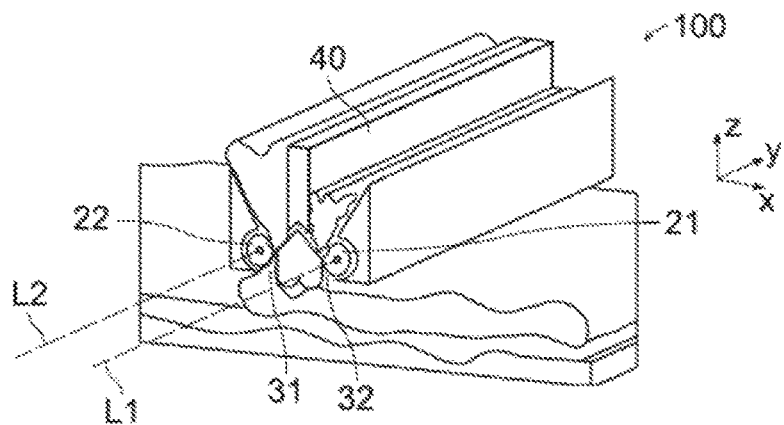
FIG. 4 is a schematic illustration of a cut-away perspective view of the hopper of FIG. 2.
Figure 5:
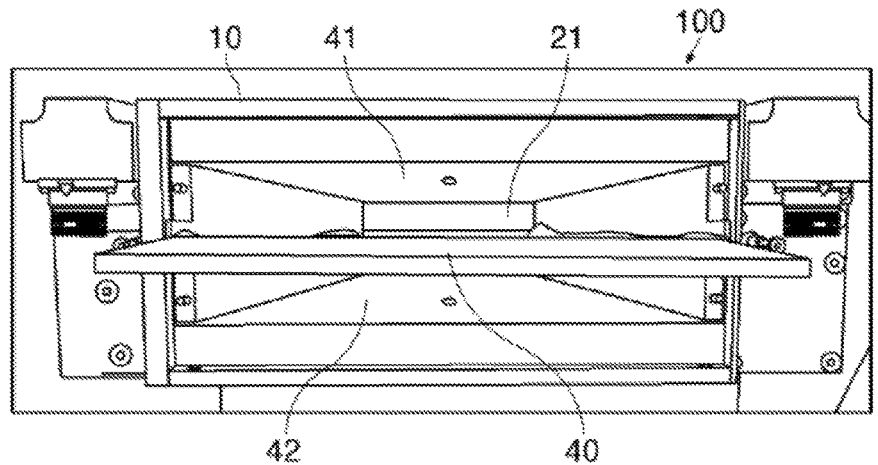
FIG. 5 is a photograph of a top view of the hopper of FIG. 3 without a divider.

As shown in FIGS. 2 to 4, in a first exemplary embodiment, the hopper 100 comprises a recoater 10 having a volume 43 for holding powder metal therein and a dispensing opening 30 from which powder metal in the recoater 10 volume 43 is deposited onto a powder bed for selective laser melting. The hopper 100 also comprises a divider 40 that divides the volume 43 of the recoater 10 into two compartments 41, 42, a first compartment 41 and a second compartment 42. The divider 40 also divides the dispensing opening 30 into two separate opening portions 31, 32, a first opening portion 31 and a second opening portion 22. The first opening portion 31 is in fluid communication with only the first compartment 41 while the second opening portion 32 is in fluid communication with only the second compartment 42. The recoater 10 further comprises two rotating cylinders or rollers 21, 22, a first roller 21 and a second roller 22, arranged in parallel. The first roller 21 is provided at the first opening portion 31 and the second roller 22 is provided at the second opening portion 32. A longitudinal axis L1, L2 of each roller 21, 22 respectively is parallel to the y axis, that is, perpendicular to the x axis or direction of movement of the hopper 100 during powder deposition. Rotation of the first roller 21 and rotation of the second roller 22 dispenses powder metal from the first compartment 41 and the second compartment 42 respectively through the first opening portion 31 and the second opening portion 32 respectively. An example of the hopper 100 of this configuration having a recoater 10 with two compartments 41, 42 separated by a divider 40 and two rollers 21, 22 at two opening portions 31, 32 respectively is shown in FIG. 5.

The two rollers 21, 22 are configured to work or rotate independently of each other. In one embodiment of use, only one roller (21 or 22) is selected to operate (i.e. rotate) at any one time during powder deposition. In such an embodiment, a recoater blade (not shown) of the hopper 100 is preferably provided between the two rollers 21, 22 to level material that has been deposited by one of the rollers (21 or 22) with each pass of the hopper 100 during powder deposition.

In another embodiment of use, both rollers 21, 22 can be operated at the same time during powder deposition when the hopper 100 is moving, in order to deposit powder metal from both compartments 41, 42 simultaneously. In such an embodiment, the hopper 100 may have a recoater blade (not shown) that is provided behind both the rollers 21, 22 to level the materials that have been simultaneously deposited by both rollers 21, 22. Appreciably, when the hopper 100 changes direction of movement along the x axis, care should always be taken to ensure that the recoater blade is trailing the rollers 21, 22 during movement of the hopper 100.

Alternatively, the hopper 100 may have two recoater blades (not shown) with both rollers 21, 22 provided between the two recoater blades. In this way, whichever one of the recoater blades is trailing the two rollers 21, 22 during movement of the hopper 100 will serve to level the materials deposited by both the rollers 21, 22, so that no repositioning of recoater blades with change of direction of movement of the hopper 100 is required.

Dividing the recoater 10 into two compartments 41, 42 allows dispensing of powder from one (41 or 42) of the two compartments (41, 42) with one (21 or 22) of the two rollers (21, 22) respectively. As only one material from one (41 or 42) of the two compartments (41, 42) can be dispensed with movement of the hopper 100 along the x axis during powder deposition on the powder bed, by filling each compartment 41, 42 with a different powder material (201, 202, FIG. 13) and configuring the operating of each roller 21, 22 to be selectable by a machine operator, this configuration allows a product to have multi-materials in both the x axis and the build direction to be fabricated by selective laser melting without requiring the build chamber to be opened to change materials in the hopper 100.

Figure 12:
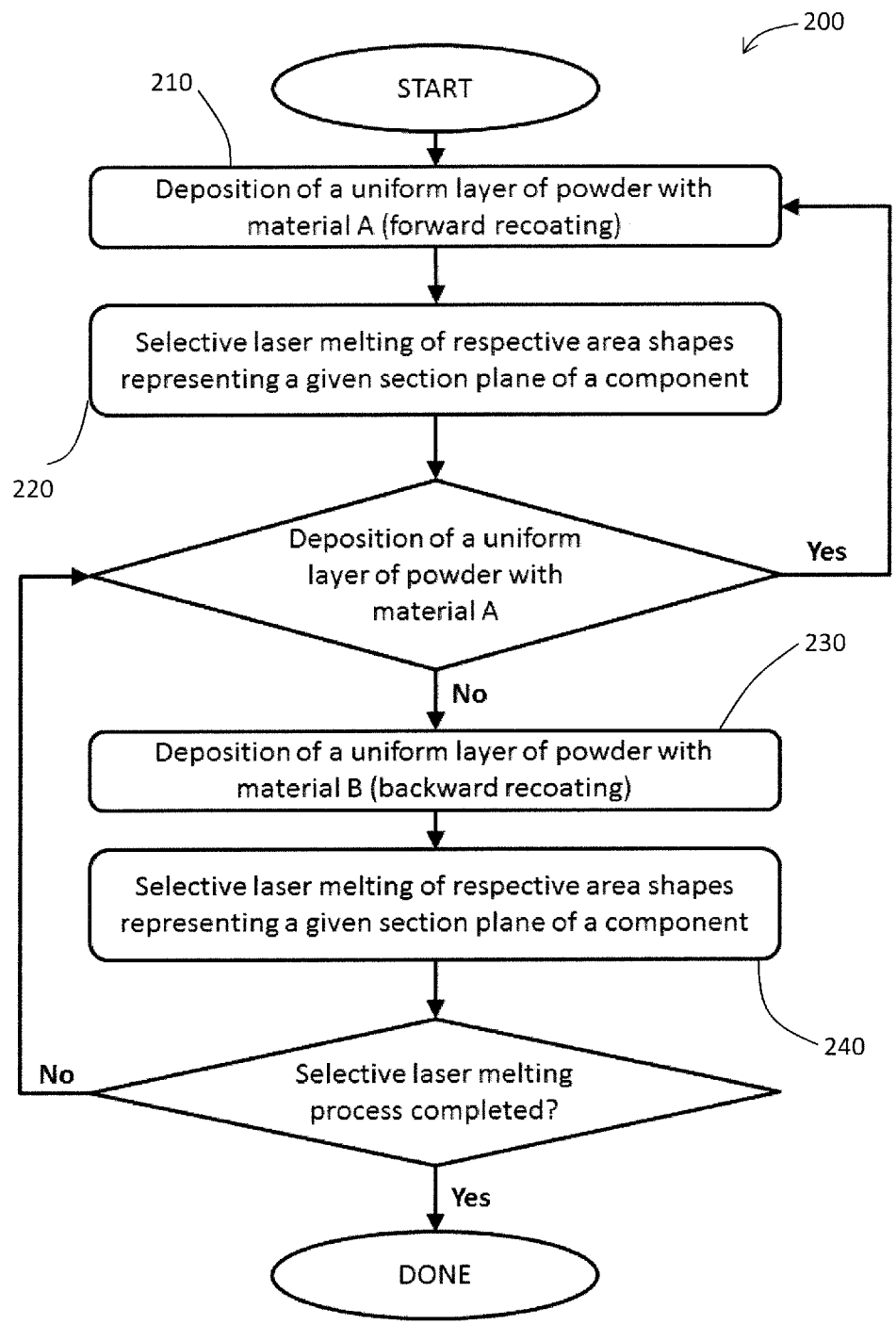
FIG. 12 is a flowchart of an exemplary method of selective laser melting using the hopper.
Figure 13:
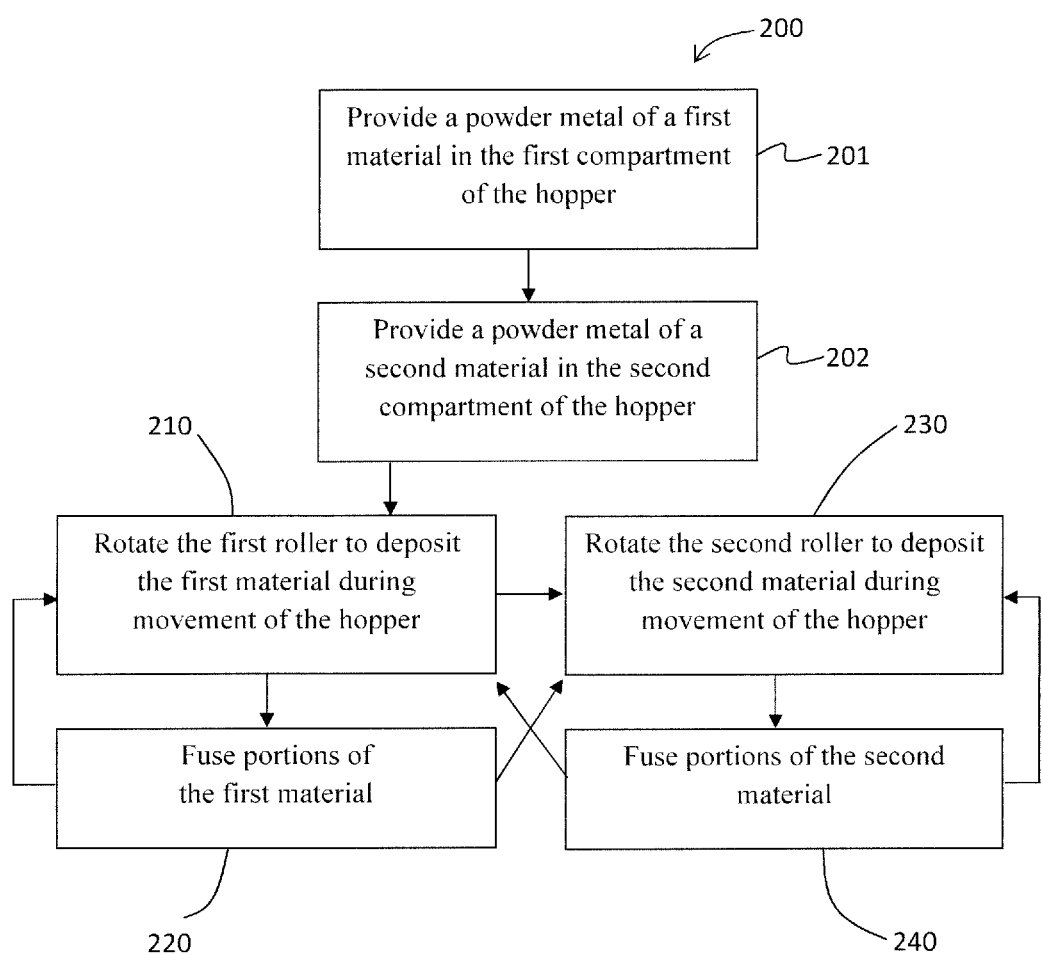
FIG. 13 is a flowchart of an exemplary method of powder bed fusion additive manufacturing using the hopper.

As illustrated in FIG. 12, in one embodiment of a method using the hopper 100, multi-material forming in the z direction may be achieved by moving the hopper 100 in a forward direction along the x axis and rotating a first 21 of the two rollers 21, 22 to deposit a first material (material A) from the hopper 100 (210) followed by selectively laser melting of respective area shapes (220) or portions of the first material to form a first layer of the product made of the first material. If required, steps 210 and 220 may be repeated to form multiple layers of material A. If not, the next step is moving the hopper 100 in a backward direction along the x axis and rotating a second 22 of the two rollers 21, 22 to deposit a second material (material B) (230) followed by selectively laser melting of respective area shapes (240) or portions of the second material to form a second layer of the product made of the second material. If necessary, steps 210, 220 and/or steps 230, 240 may be repeated. This is achieved by selecting either "forward recoating" or "backward recoating" during the machine operation, as shown in FIG. 2. This is possible due to the hopper 100 having two rotating cylinders 21, 22, in front and behind of the divider 40, also shown in FIG. 2, that acts as the dispensing mechanism during the powder deposition process in SLM. Only one (21 or 22) of the rotating cylinders (21, 22) will rotate during the deposition of powder. The respective rotating cylinder 21, 22 that rotates during "forward recoating" or "backward recoating" of powder is indicated as 'F' (21) and 'B' (22) in FIG. 2 respectively.

In another embodiment of a method using the hopper 100, forming a multi-material layer in the x direction may be achieved by filling the compartments 41, 42 with a first material and a second material respectively (201, 202) moving the hopper 100 in only one direction (either forward or backward) along the x axis while first rotating only the first roller 21 to deposit the first material on a first part of the powder bed (210) and then rotating only the second roller 22 to deposit the second material on a second part of the powder bed (230). The deposited first material and second material are thus on the same layer on different parts of the powder bed prior to selective laser melting, thereby allowing a product of multi-materials in the x direction to be formed in a same layer by selectively laser melting portions of the first material and the second material (220, 240). If necessary, the hopper 100 may be moved over all of the deposited first and second materials on the same layer prior to selective laser melting in order to ensure that an even layer of materials is deposited. As described above, one or more recoater blades (not shown) should be appropriately provided with each pass of the hopper 100 during powder deposition to level the material or materials that have been deposited by one or both of the rollers 21, 22.

To fabricate a product having multi-materials in all three directions/axes, i.e., x, y and z, in a second exemplary embodiment, the hopper 100 may further comprise a number of partition dividers 50. The partition dividers 50 are spaced apart along the y axis (as shown in FIGS. 6(a)-(b), 6(d)-(f)) so that the hopper 100 is further separated into a number of partitions 51, 52, 53 along an axis perpendicular to direction of movement of the hopper 100, i.e., in the y direction. The partitions 51, 52, 53 can each be filled with powder metal and are in fluid communication with the dispensing opening 30. The divider 40 divides the volume in at least one 52 of the partitions 51, 52, 53 into the two separate compartments 41, 42 that can be filled with different materials to be dispensed by the two rollers 21, 22 respectively. More than one of the partitions 51, 52, 53 can be divided into separate compartments for dispensing different materials via each of the two rollers 21, 22 respectively.

Figure 8:
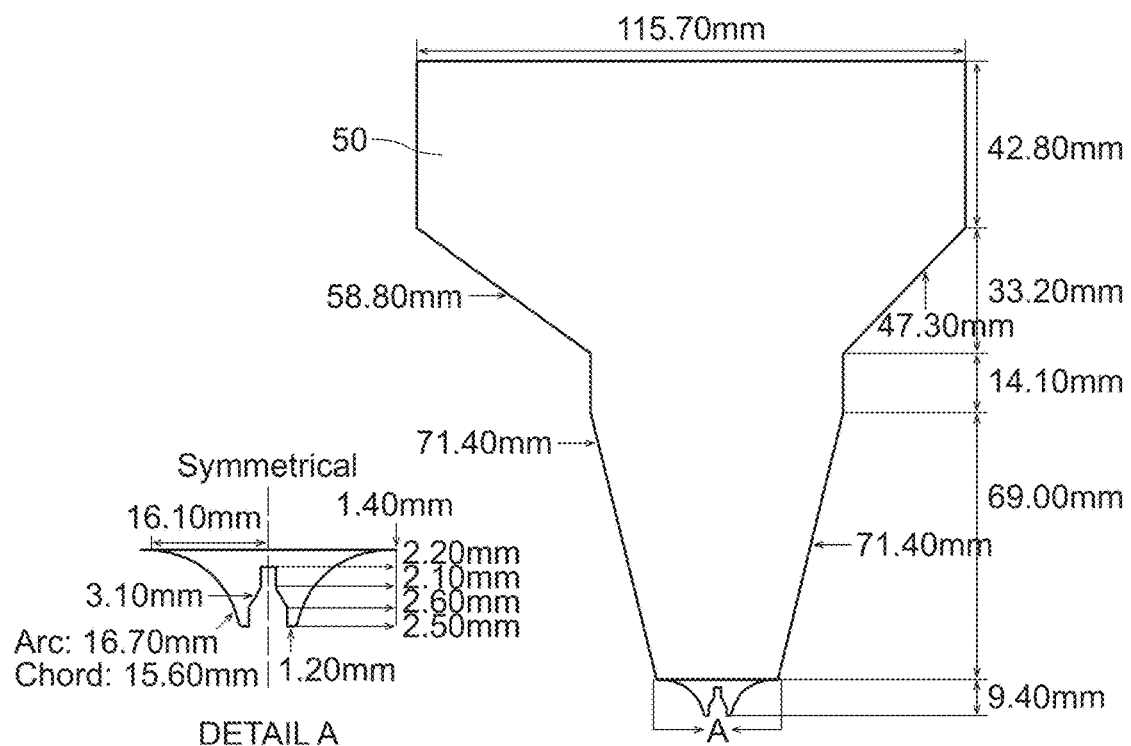
FIG. 8 shows other dimensions of the partition divider of FIG. 6(a).

In the second exemplary embodiment, the partition dividers 50 are assembled with a hopper shell 60 to form a hopper assembly 70. The hopper assembly 70 is assembled with or provided on the recoater 10 of the first embodiment of the hopper 100 as described above. Multiple slots 61 may be made within the hopper shell 60 as shown in FIGS. 6(c)-(f), the slots 61 being configured to engage the partition dividers 50. The multiple slots 61 cater to partition dividers 50 of different sizes and allow different numbers of partitions dividers 50 to be used simultaneously. Each partition divider 50 is designed to have a tight fit with the hopper shell 60 to prevent contamination of the powders in the different partitions 51, 52, 53, and at the same time, to have enough gap at the lower end tip at the dispensing opening 20 of the recoater 10 to allow rotation of the rotating cylinders 21, 22 for dispensing of powders held in the partitions 51, 52, 53 and compartments 41, 42. The gap should be just slightly larger than the powder size used in SLM, for example, if the maximum powder size used is 60 µm, the gap should be designed to be approximately 65 µm. As shown in FIG. 6(a), the shape of the partition divider 50 is made according to the shape of the hopper shell 60 and the recoater 10. Cut-outs 63 at the bottom of the hopper shell 60 as shown in FIG. 6(b) ensure a tight fit between the hopper shell 60 and the recoater 10. FIG. 6(d) shows the assembly of the hopper shell 60 and the partition divider 50. The assembled hopper prototype or hopper assembly (comprising the hopper shell 60 and the partition divider 50) fits into the recoater 10 of the first embodiment without any gap in between as shown in FIG. 6(e). FIG. 6(f) shows the hopper shell 60 and the partition divider 50 fitting with the recoater 10 nicely. Dimensions of the hopper shell 60 and the partition divider 50 are shown in FIGS. 7 and 8.

Figure 9:
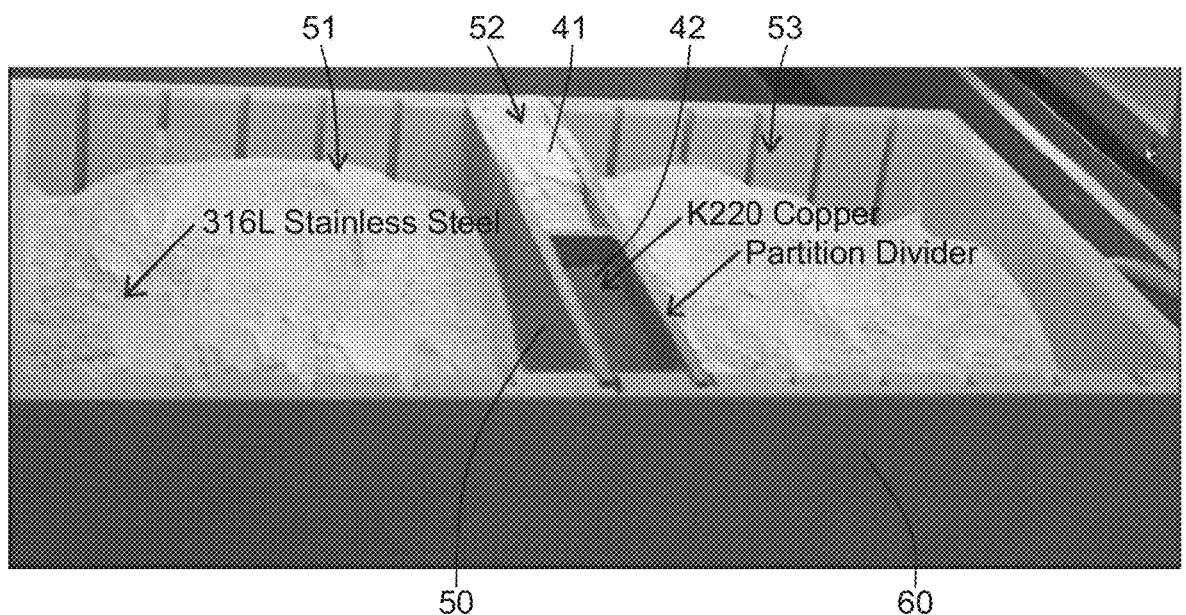
FIG. 9 shows different powder placement within different compartments and partitions of the hopper assembly of FIG. 6(d).
Figure 10:
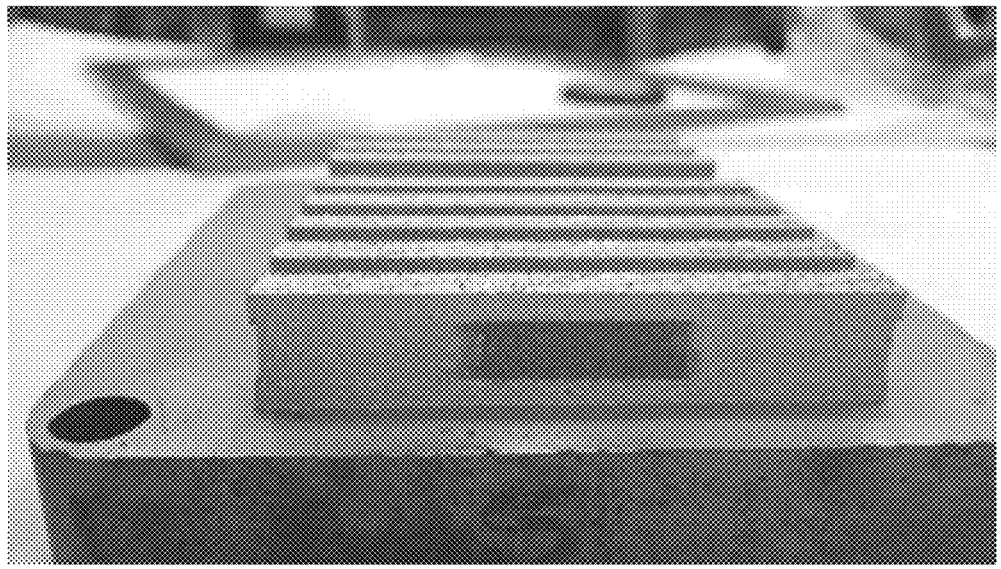
FIG. 10 is a front view of a multi-material product made using the hopper of FIG. 6(e).

By filling the middle partition divider's (50) two compartments 41, 42 with different materials (316L stainless steel and K220 copper as shown in FIG. 9), the machine operator would have control of which material to deposit without opening the build chamber. In an example of use of the second exemplary embodiment of the hopper 100, a resulting product made using the hopper 100 is shown in FIG. 10. As can be seen, the hopper 100 allows multi-material fabrication in the xy plane and z direction. With additional partition dividers 50 added to the hopper 100, more than two materials can be deposited in the xy plane. This was previously impossible with the existing designs which makes this invention an improvement compared to the prior art designs shown in FIGS. 1(a) and 1(c). The speed of deposition makes it more favourable compared to nozzle deposition shown in FIG. 1(b)—prior art.

Figure 11:
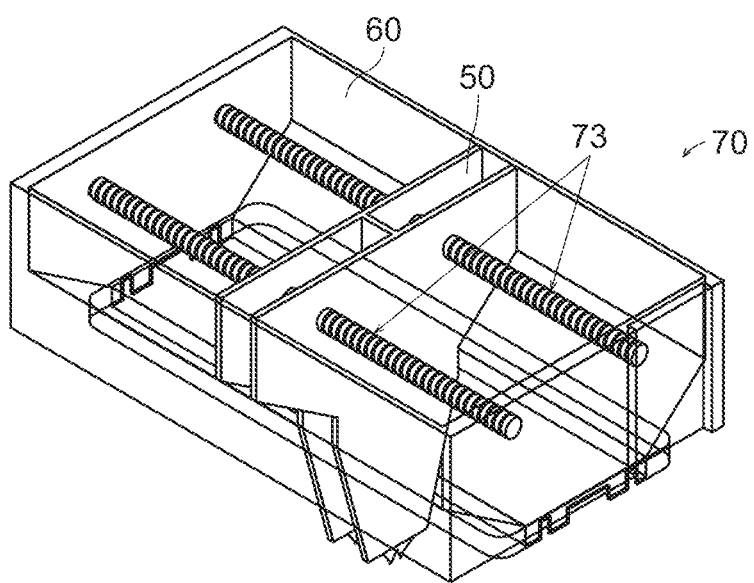
FIG. 11 is a perspective view of an alternative embodiment of the hopper assembly of FIG. 6(d).

In an alternative embodiment of the hopper assembly 70 as shown in FIG. 11, a number of actuators 73 may be provided to move and reposition the number of partition dividers 50 within the hopper shell 60 to allow automated change in the sizes of the partitions 51, 52 53 in the second exemplary embodiment of the hopper 100. By using actuators 73, the partition dividers 50 can be moved automatically during the build process to allow variation in surface area and/or location of deposition of the different materials in the partitions 51, 52, 53 and compartments 41, 42.

By combining various directions of movement of the hopper 100 with various selections of rotation of the first roller 21 and the second roller 22 for various layers of deposited material that are selectively laser melted for each layer, it can be envisaged that a product of multi-materials in all directions may be made using the hopper 100 disclosed in the present application.

Advantageously, the presently disclosed hopper design enables SLM to fabricate samples with one material surrounding the other material. For instance, the possible outer materials could be those with high mechanical strength or high corrosion resistance, and the inner material could have high heat conductivity or high electric conductivity depending on the usage of the fabricated piece. One possible application of such combination of materials would be in nuclear plants where high mechanical strength is required at the outside, while high heat conductivity is required inside to control the direction of heat flow. The hopper design can also be used for other applications that require multi-materials in single build, for example, customised implants with biocompatible coating. One such implant can be made with Ti6Al4V core with coating of hydroxyapatite. With correct material combinations, the present hopper can be applied in many industries.

Figure 6:
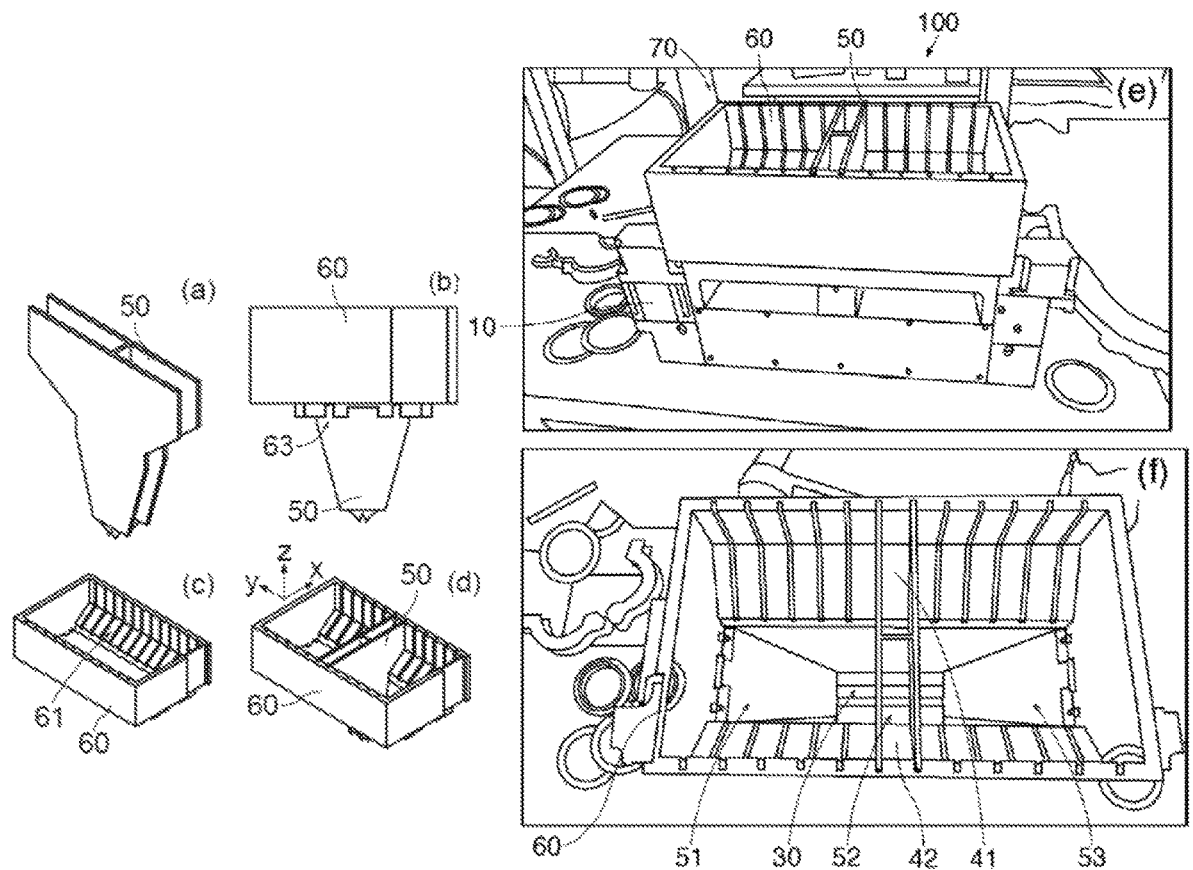
FIG. 6(a) is a perspective view of a partition divider for a second exemplary embodiment of the hopper.
FIG. 6(b) is a side view of a hopper assembly comprising the partition divider of FIG. 6(a) in assembly with a hopper shell.
FIG. 6(c) is a perspective view of the hopper shell of FIG. 6(b).
FIG. 6(d) is a perspective view of the hopper assembly of FIG. 6(b).
FIG. 6(e) is a perspective view of a second embodiment of the hopper.
FIG. 6(f) is a top view of the hopper of FIG. 6(e).

Whilst there has been described in the foregoing description exemplary embodiments of the present invention, it will be understood by those skilled in the technology concerned that many variations and combinations in details of design, construction and/or operation may be made without departing from the present invention. For example, while the various embodiments described above have been in relation to selective laser melting, the embodiments can equally well be configured to be used with other forms of powder bed fusion technologies, Although only a single partition divider 50 is shown in FIGS. 6(d) to 7 and used as an example in the second exemplary embodiment of the hopper 100, the number of partition dividers 50 and partitions formed therewith may be more than one. By using more of such partition dividers in the hopper 100, more materials can be added into the hopper 100, which allows more than two materials to be processed by SLM. In addition, the spacing and position of the partition divider can also be modified to give a wide variety of sizes and configurations in the multi-material processed part. While more than one actuator is depicted in FIG. 11, the number of actuators may be only one. While the embodiments described above disclose use of two rollers corresponding with two compartments to dispense two different materials, alternative embodiments of the hopper may have more than one divider in order to divide the hopper into more than two compartments that each have a corresponding roller to dispense more than two different materials. In this way, in the z direction (and also the x direction, if desired), the formed part can be made of more than two materials. For example, the hopper may have two dividers forming three compartments, and have three corresponding rollers to dispense three different materials from the three compartments respectively.

REFERENCES

[1] P. Regenfuss, A. Streek, L. Hartwig, S. Klotzer, T. Brabant, M. Horn, R. Ebert, H. Exner, Principles of laser micro sintering, Rapid Prototyping Journal, 13 (2007) 204-212.
[2] O. M. Al-Jamal, S. Hinduj a, L. Li, Characteristics of the bond in Cu—H13 tool steel parts fabricated using SLM, CIRP Annals—Manufacturing Technology, 57 (2008) 239-242.
[3] V. E. Beal, P. Erasenthiran, C. H. Ahrens, P. M. Dickens, Evaluating the use of functionally graded materials inserts produced by selective laser melting on the injection moulding of plastics parts, Proceedings of the Institution of Mechanical Engineers, Part B: Journal of Engineering Manufacturing, 221 (2007) 945-954.

The invention claimed is:

1. A hopper for powder bed fusion additive manufacturing, the hopper comprising:
    a recoater having a volume for holding powder metal therein;
    the recoater having a dispensing opening from which powder metal in the volume is deposited onto a powder bed for selective laser melting during powder bed fusion additive manufacturing,
    a number of partition dividers separating the volume into a number of separate partitions, wherein the number of separate partitions are arranged along an axis perpendicular to a direction of movement of the hopper, wherein each partition can be filled with powder metal and is in fluid communication with the dispensing opening;
    a divider extending between at least two partition dividers of the number of partition dividers, wherein the divider separates at least one partition of the number of separate partitions into a first compartment and a second compartment and separates the dispensing opening into a first opening portion and a second opening portion, wherein the first compartment and the second compartment are arranged along an axis parallel to the direction of movement of the hopper within the at least one partition; and
    a first roller arranged in parallel with a second roller, the first roller provided at the first opening portion and the second roller provided at the second opening portion, a longitudinal axis of the first roller being perpendicular to direction of movement of the hopper during powder metal deposition;
    wherein rotation of the first roller and rotation of the second roller dispenses a first powder metal and a second powder metal from the first compartment and the second compartment respectively through the first opening portion and the second opening portion respectively onto the powder bed, and wherein the first roller and the second roller are configured to rotate selectably and independently of each other.

2. The hopper of claim 1, wherein more than one of the partitions is divided into compartments by the divider.

3. The hopper of claim 1, wherein the number of partition dividers are assembled with a hopper shell to form a hopper assembly, the hopper assembly assembled on the recoater.

4. The hopper of claim 3, wherein the hopper shell has multiple slots configured to engage the number of partition dividers.

5. The hopper of claim 3, further comprising a number of actuators configured to move and reposition the number of partition dividers in the hopper shell.

6. A method of powder bed fusion additive manufacturing using a hopper, wherein the hopper comprises:

a recoater having a volume for holding powder metal therein;

the recoater having a dispensing opening from which powder metal in the volume is deposited onto a powder bed for selective laser melting during powder bed fusion additive manufacturing, a number of partition dividers separating the volume into a number of separate partitions, wherein the number of separate partitions are arranged along an axis perpendicular to a direction of movement of the hopper, wherein each partition can be filled with powder metal and is in fluid communication with the dispensing opening;

a divider extending between at least two partition dividers of the number of partition dividers, wherein the divider separates at least one partition of the number of separate partitions into a first compartment and a second compartment and separates the dispensing opening into a first opening portion and a second opening portion, wherein the first compartment and the second compartment are arranged along an axis parallel to the direction of movement of the hopper within the at least one partition; and a first roller arranged in parallel with a second roller, the first roller provided at the first opening portion and the second roller provided at the second opening portion, a longitudinal axis of the first roller being perpendicular to direction of movement of the hopper during powder metal deposition;

wherein rotation of the first roller and rotation of the second roller dispenses a first powder metal and a second powder metal from the first compartment and the second compartment respectively through the first opening portion and the second opening portion respectively onto the powder bed, and wherein the first roller and the second roller are configured to rotate selectably and independently of each other, wherein the method comprises:
(a) providing a powder metal of a first material in the first compartment;
(b) providing a powder metal of a second material in the second compartment;
(c) rotating the first roller to deposit the first material during movement of the hopper;
(d) fusing portions of the first material;
(e) rotating the second roller to deposit the second material during movement of the hopper; and
(f) fusing portions of the second material.

7. The method of claim 6, wherein movement of the hopper in step (c) is in a first direction and movement of the hopper in step (e) is in a second direction.

8. The method of claim 6, wherein steps (c) and (d) are repeated after steps (e) and (f).

9. The method of claim 6, wherein steps (c) and (d) are repeated a number of times before steps (e) and (f).

10. The method of claim 6, wherein steps (e) and (f) are repeated a number of times.

11. The method of claim 6, wherein step (e) is performed before step (d) and wherein movement of the hopper in steps (c) and (e) are in a same direction so that the first material and the second material are deposited in a same layer.

* * * * *